Figure 1:
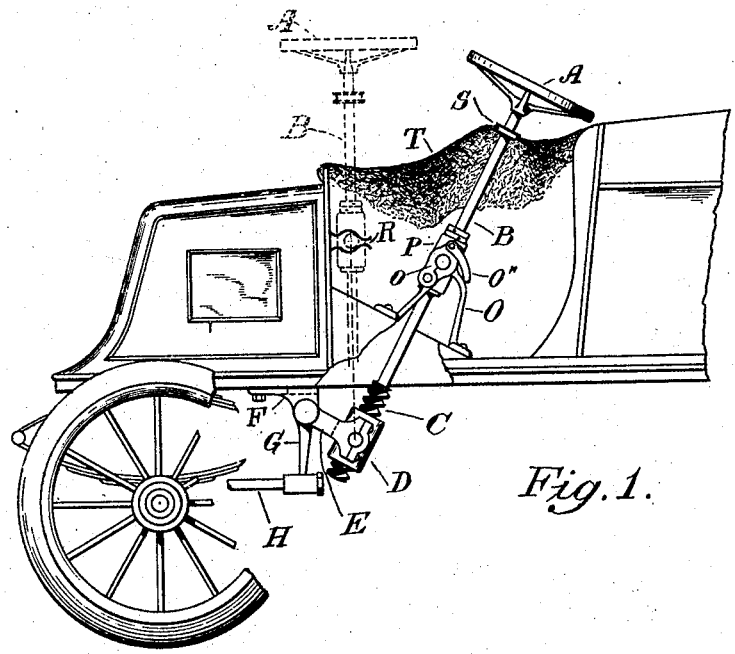

No. 806,612. PATENTED DEC. 5, 1905.
H. W. ALDEN.
STEERING MECHANISM FOR MOTOR VEHICLES.
APPLICATION FILED JUNE 16, 1902.

3 SHEETS—SHEET 1.

Witnesses:
J. E. Coleman
M. L. Clark

Inventor.
Herbert W. Alden
By Hermann ———
his Att'y

No. 806,612. PATENTED DEC. 5, 1905.
H. W. ALDEN.
STEERING MECHANISM FOR MOTOR VEHICLES.
APPLICATION FILED JUNE 16, 1902.
3 SHEETS—SHEET 2.
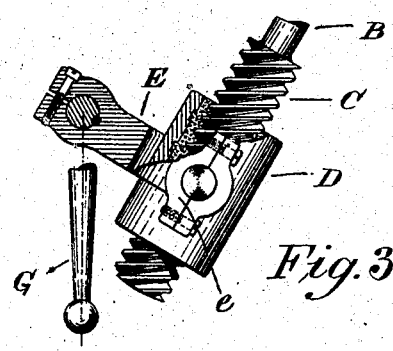
Fig. 3.
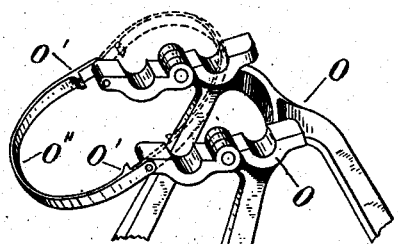
Fig. 5.
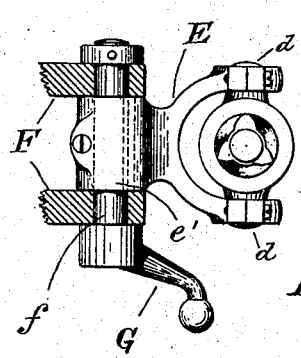
Fig. 4.
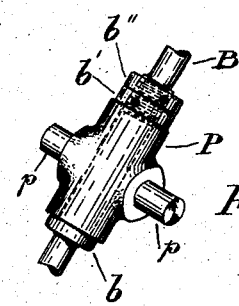
Fig. 6.
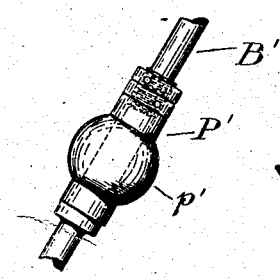
Fig. 9.
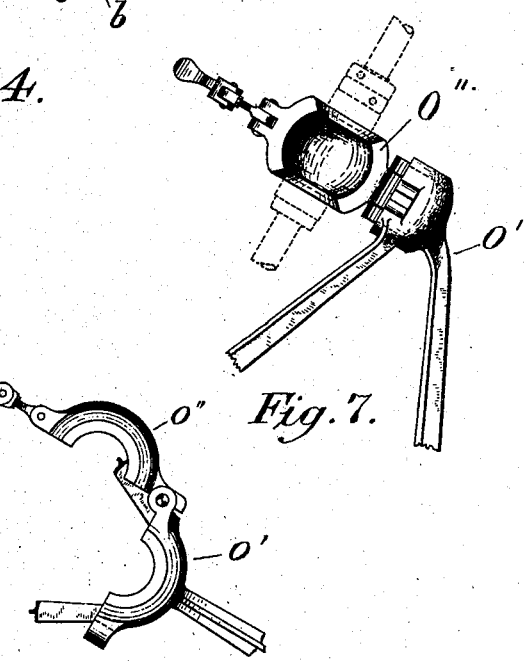
Fig. 7.
Fig. 8.
Witnesses:
J. E. Coleman
M. L. Clark
Inventor.
Herbert W. Alden
By Hermann Schmitz
his Att'y.

No. 806,612. PATENTED DEC. 5, 1905.
H. W. ALDEN.
STEERING MECHANISM FOR MOTOR VEHICLES.
APPLICATION FILED JUNE 16, 1902.

3 SHEETS—SHEET 3.

Witnesses:
J. E. Coleman
M. L. Clark

Inventor.
Herbert W. Alden
By Hermann Kuntz
his Att'y.

UNITED STATES PATENT OFFICE.

HERBERT W. ALDEN, OF HARTFORD, CONNECTICUT, ASSIGNOR TO ELECTRIC VEHICLE COMPANY, OF JERSEY CITY, NEW JERSEY, A CORPORATION OF NEW JERSEY.

STEERING MECHANISM FOR MOTOR-VEHICLES.

No. 806,612.      Specification of Letters Patent.      Patented Dec. 5, 1905.

Application filed June 16, 1902. Serial No. 111,816.

*To all whom it may concern:*

Be it known that I, HERBERT W. ALDEN, a citizen of the United States, residing in Hartford, in the county of Hartford, State of Connecticut, have invented certain new and useful Improvements in Controlling Mechanism for Motor-Vehicles, of which the following is a specification, reference being had to the accompanying drawings, forming a part hereof.

This invention relates in general to operating mechanism, and more particularly to steering mechanism for motor-vehicles or the parts of such manipulated by the operator, and connections between such parts for transmitting the operating movements to the deflecting or steering road-wheels. As the steering of a road-vehicle, particularly when moving over rough roads or at considerable speed, is one of the vital points of construction, it is necessary that these parts be substantially made, so that they will resist wear under usual use and resist any ordinary or excessive strains they are liable to be subjected to. Furthermore, the parts should be easily operated by the occupant, while being convenient and not encumber any more than necessary the occupant's space.

The object of this invention is to meet these and various requirements, as will hereinafter be more specifically referred to.

While it has heretofore been suggested to move the steering wheel or lever operated by the driver to and from the seat for convenience, one of the objects of my present invention is an improved construction and arrangement for this purpose, and while so-called partial or total "back-lock" connections between the steering-pillar and wheel-operating mechanism have been used heretofore it is one of my objects to simplify this feature of the construction to make it more durable, stronger weight for weight, and cheaper in construction.

A further object is to so construct or arrange my steering-pillar that the operating means will not be encumbered by the usual apron or boot used in inclement weather, but rather that it may form a support for more securely and effectively attaching the same, so that it will protect the parts and be adjustable with the steering-pillar.

While described as particularly applicable to steering mechanisms, certain novel features of my invention are equally useful in other connections, as for operating other controlling means.

My invention is more fully described hereinafter with reference to the accompanying drawings, in which it is embodied in practical form, though it will be clearly understood that numerous variations can be made.

Figure 2:
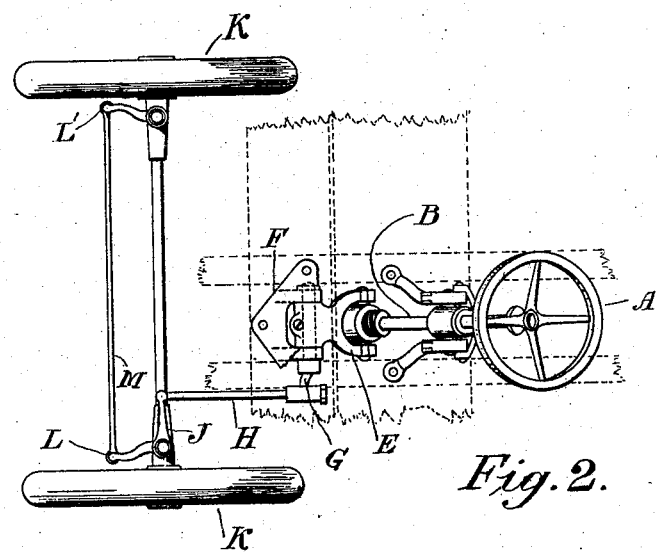
Figure 10:
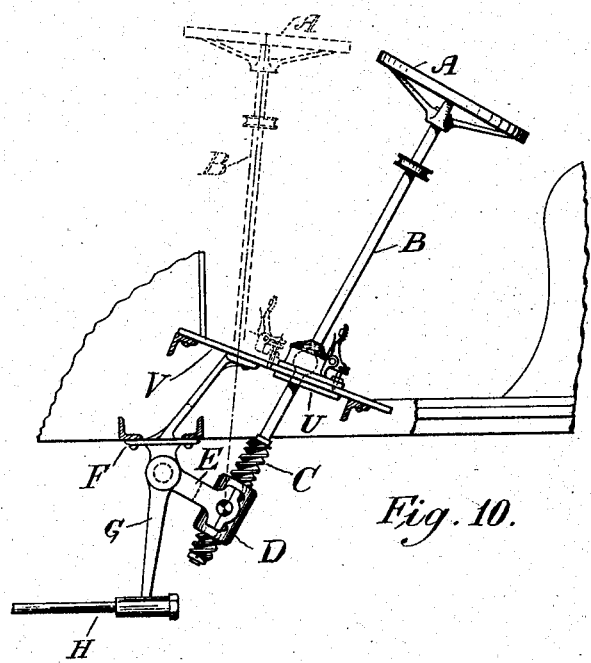
Figure 14:
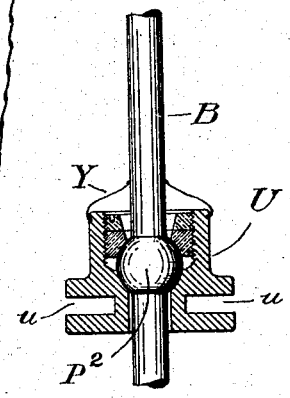
Figure 11:
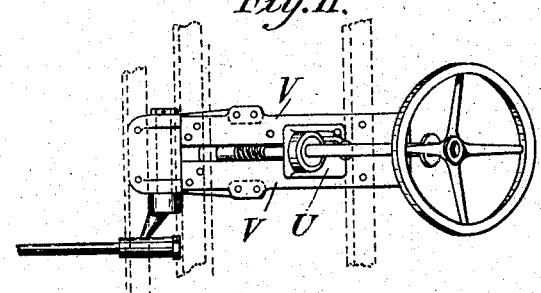
Figure 12:
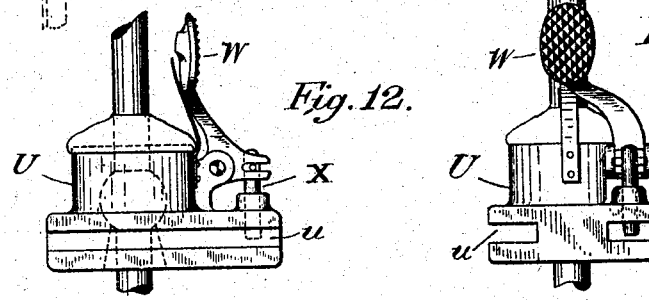
Figure 13:
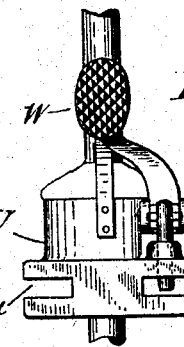

In the drawings, Figure 1 is a side view of the forward portion of an automobile, showing steering connections embodying my invention. Fig. 2 is a plan view of the forward steering-wheels of an automobile and the steering connections shown in Fig. 1. Figs. 3 and 4 are respectively side elevation and plan of the lower end of the steering-pillar and its connections. Fig. 5 is a perspective of the bracket supporting the thrust-bearing of the steering-pillar, the bearing-blocks being shown opened. Fig. 6 is a thrust-block adapted to be clamped in the bracket, Fig. 4. Figs. 7, 8, and 9 show a modified form of thrust-bearing and support for the steering-pillar, being respectively a side elevation of the bracket opened, plan of the bracket opened, and the special form of thrust-bearing adapted thereto. Fig. 10 shows the embodiment of the invention with the thrust-bearing supported in a modified arrangement of floor-bracket, the whole in elevation with associated parts of the vehicle. Fig. 11 shows the construction of Fig. 10 in plan with portions of the body, to which mechanism it is attached. Figs. 12 and 13 show in detail a sliding thrust-bearing bracket, such as embodied in Figs. 10 and 11, respectively, in side elevation and rear elevation. Fig. 14 shows a section of the sliding bearing-bracket, the same taken vertically through the axis of the steering-shaft and transverse of the vehicle.

In the embodiment of my invention, A is the steering wheel or handle, which is mounted upon a shaft B, which carries at its lower end a threaded or toothed member C. The latter engages a threaded or toothed block D, operatively connected with the rock-shaft arm E, supported in a bracket F and connected with an oscillating arm G, which moves a rod H, connecting by a flexible joint and arm J to turn the road-wheel K, which through the arm L, link M, and arm L' operates simultaneously the opposite steering-wheel K. In the form shown bracket F is rigidly attached to the framework or body of the vehicle, in which there is also attached in this form the bracket O. This bracket O supports a thrust-bearing P, in which the steering-pillar B is mounted. In the oscillation of the arm E, which is effected to deflect the road-wheels, the end of that arm moves in an arc of a circle, and therefore not always in the axis of the steering-pillar in case the latter should be stationary. To accommodate this motion of an oscillating arm of this sort in a steering mechanism, it has heretofore been usual to embody relatively complicated connections, so that the engaging members will not be strained or wear excessively and not be subjected to lost motion. In this invention I have supported the block D by trunnions in the end of this arm, and the thrust block or bearing carrying the steering-pillar B, I also support, so that it when in operating position is susceptible of slight oscillation. This oscillation of the pillar-support is substantially about an axis parallel with the axis of oscillating arm E. To this end block D has trunnions $d$, supported in bearings $e$, while E is forked to carry the block and has a long bearing $e'$, suported in the bracket F, the long bearing effectually preventing movement due to distorting strains. Shaft $f$, carried in ample bearings in bracket F, firmly supports arm E and also supports the depending arm G, so that the slightest movement of the arm E due to the movement of block D, effected by a rotation of screw C, is immediately transmitted without any lost motion to the depending arm G and through suitable connections, such as those described, to the road-wheels. The thrust-block P, supported on the pillar B, engages the collar $b$, while lock-nuts $b'$ and $b''$ coacting therewith prevent longitudinal movement of the steering-shaft. It will be noted in the form illustrated that the plate F has two bearings, intermediate of which the arm E is supported, while E is secured to a shaft projecting laterally beyond one of the bearings in F and has attached to it the arm G. Thus the strain due to the operator moving the arm E is most advantageously resisted by the arrangement as described, preventing wear and securing maximum strength with the least weight of material, while it also permits the location of the substantially vertical arm G at any point laterally on the vehicle irrespective of the location of the steering mechanism for the convenience of the operator by making the supporting shaft or pin long or short. The shaft thrust-bearing as described or such as hereinafter mentioned will accommodate any lateral movement of the end of the shaft, not alone that due to a traverse-block moving in an arc. In the various forms of my construction the connections at the lower end of the shaft may move in many different ways, and the supporting of the shaft accommodates any movement or oscillation, even if non-coincident with the normal axis of the shaft. Whether the oscillating part moves in a curve or straight line not coinciding with the normal shaft-axis the thrust-bearing will accommodate the consequent lateral displacement of the lower shaft end without any cramping, increased wear, or other disadvantage.

For the advantageous operation of a steering mechanism of this sort it is very necessary that the thrust-bearing on the shaft be held in substantially fixed relation with the bearings of the part oscillated by the shaft. In this case the bracket F, supporting the rockshaft, should be held in fixed relation with the bracket O, supporting the bearings P. With these bearings in substantially rigid relation the slightest movement due to the threaded part in the form shown will cause an immediate response in oscillation of the depending arm G, and consequently deflection of the steering road-wheels. When convenient, I would prefer to embody these bearings in the same casting or built-up piece to insure this relative rigidity. However, in the form shown there are some other advantages in having the traverse-block and the oscillating bearing on the shaft some distance apart, for the reason that the slight movement of the lower end of the shaft due to the arc described by the arm G, which only amounts substantially to the verse sign of the angle of oscillation of arm G from its central position, causes a deflection of the hand-wheel. In practice with the bearings conveniently located in ordinary construction the oscillation of the hand-wheel due to this cause would probably be less than an inch; but even if more than this as the maximum is reached only when turning the wheels hard over, and therefore very seldom, it would be no inconvenience.

In order that the steering hand wheel or lever can be moved out of the way of the operator when the vehicle is stopped or at any time for convenience in the forms shown in Figs. 1 to 6, inclusive, the thrust-bearing P is constructed with trunions $p$, engaging in hinged bearings $o$, which latter can be released simultaneously by the latches $o'$, connected by the handle $o''$. It will be seen that the handle $o''$ (shown in the dotted position in Fig. 5) is made long enough to reach round the rear side of the steering-pillar, so that upon releasing it the hinged parts of the bearing will move sufficiently to permit the trunnions to pass forward thereover, and so enable the operator to move the whole steering-shaft and thrust-bearing forward into the position shown in dotted lines, Fig. 1. In the latter figure a latch or clamp R is engaged by the trunnion-block, so as to hold it in place temporarily, while clamps may be provided so that the steering-shaft itself will be held.

In the construction shown in Figs. 7, 8, and 9 the thrust-bearing on the shaft has a portion $p'$, spherically fashioned instead of with supporting-trunnions, which is clamped into a spherical bearing $O''$. This spherical bearing permits the necessary slight oscillation of the steering-pillar and also enables the latter to be securely clamped and released by the movement of a single latch which, as shown, is adjustable in order to take up any wear that may take place in the spherical bearing. This construction of spherical bearing can be very advantageously supported in a movable bracket, as shown in Figs. 10 to 14, inclusive, instead of in the fixed bracket O. However, such a sliding bracket-support is not solely adapted to such a thrust-bearing, but can also be made to embody other forms of bearings—as, for instance, such with trunnions—though I prefer the form shown.

In Figs. 10 to 14 thrust-bearing $P''$ is supported in the bracket U by means of a seat and complementary screw-cap with locking means, so that the same may be adjustably held in such position. The movable bracket U, with slotted sides $u$, is supported by the engagement of the latter with plates V, rigidly held on the framework or body. These guides are also rigidly connected with the base or supporting-bracket F, and therefore with the bearings of the bell-crank E G, so that the thrust-bearing on the rotating or operating shaft will be held in fixed relation with the bearings of the oscillated member E. In some forms I prefer to secure this rigidity, as already mentioned, by embodying the supporting means for these bearings or their bases in an integral casting, so as to absolutely prevent any displacement. On the movable bracket U, I secure a foot-press W, connected to operate a latch X, which engages in holes in the guides, so as to lock the movable bracket in predetermined positions. It will be seen in this latter construction that by pressing upon the foot-piece W the latch X is drawn and the back of the foot-press engages with the pillar, so that a further pressure exerted by the foot is against the pillar and without further straining the small parts operating the latch enables the occupant to push the whole pillar forward by means of his foot and throw it out of his way, leaving a clear exit from the vehicle. Upon release of the foot the spring will throw the foot-press back and drive the latch X into another hole provided to secure the steering-pillar in its forward position. By having the bracket move in this way the thrust-bearing is always operatively held, no matter what position the steering-shaft is in, so that in case the vehicle should start when the occupant has not drawn the steering-wheel into convenient position the vehicle will still be under perfect control and the steering-wheels always operatively connected. As the movement of the pillar forward away from the operator is about a center in the oscillating lever E, the bracket U should move in the arc of a circle which, however, is not of great curvature for the angularity of throw usually necessary; but in some cases I would construct the guides V on an arc about the normal center of forward oscillation of the steering-shaft, which would then necessitate machining the engaging bearings or bracket U to fit the curve, which would increase the expense of construction. In the form shown I have used the simpler construction, consisting of the straight guide-plates, as the movement of the pillar forward will only tend to slightly deflect the steering-wheels as it is pushed to its upright position and will in no way interfere with the proper operation and general advantages of the construction. In this construction the screw portion C is a separate member attached, as I have shown in Fig. 10, by means of collars or nuts, or it can be secured by any mechanical means. To allow for the oscillation of the steering-shaft in the movable bracket in the form shown a slight opening is necessary, which I cover by means of a leather or other small cap Y.

In the parts of a steering mechanism with which my invention deals in general present construction in some cases involves the embodiment of the thrust-bearing of the shaft and the bearing of the members oscillated by the shaft in close proximity. When this is done, the bearing supporting the shaft and supporting the oscillating bell-crank or levers is easily made in one piece, such as a casting, and can therefore be machined, so that the bearings will be very accurately located with respect to each other. If it is desirable to have the thrust-bearing and the oscillating shaft-bearing some distance apart, this machining is not so readily accomplished and there is more tendency for relative displacement of the bearings, while with built-up parts in the framework of the vehicle or in conjunction with the framework of the vehicle it may in cases be more expensive to secure absolute accuracy in the relative location of these bearings, and for this latter reason my construction holds out distinct advantages. It will be seen that with the spherical joint or thrust-bearing, as shown in some of the figures, there is provision made for oscillating in at least one direction, and this can be increased to permit deflection of the steering-shaft in other directions as well. In addition to this I so arrange the engaging member on the oscillating lever as to permit different angularity of the steering-shaft. A ball-and-socket joint with side wings to prevent rotation meets the requirements at that end of the steering-shaft, and if the engaging threaded block is so mounted in the oscillating lever it will be seen that the bell-crank lever and bearings can be permanently secured on the framework without accurate alinement with the upper shaft-bearing or bearing-bracket, which can then be secured to the framework permanently and irrespective of the precise position of the former bracket. This absence of a necessity for absolute alinement of the parts would greatly facilitate assembling the mechanism, and having the ball-joints it will be seen that any disalinement is entirely compensated for in the joint, which in spite of the disalinement avoids any chance of cramping or jamming of parts. This would also enable the hand operating-wheel on a vehicle to be located differently in vehicles under construction without changing the whole system of steering connections and would only involve a lateral or other desired displacement of the steering-shaft-supporting bracket. A displacement of this shaft quite oblique to the plane of movement of the oscillating lever would of course not be desirable; but there is no trouble in any slight obliquity.

Under circumstances it is desirable to have the steering-wheel protrude through and clear of the boot or apron, as the horn or controlling-levers are sometimes attached to it, and some of these must not be under cover or inside for intelligent manipulation by the operator. For this purpose a grooved collar S is embodied near the upper end of the steering-pillar B, and the boot T is secured in this groove, effectually protecting the occupant and parts covered from the weather. By this arrangement the operator is not encumbered in the operation of the hand-wheel or associated parts, and when throwing the wheel forward the boot or apron is simultaneously carried forward out of the way of the occupant by the same operation to afford an unhindered exit, but still protecting the parts of the steering mechanism. The apron or boot for this purpose is made with a circular hole and preferably steel spring-eyelet to clamp into the grooved collar, while from one side of the hole there is a slit and flap large enough to permit the entire robe to be put over the wheel.

While the grooved wheel in the accompanying drawings is shown as located on the rotating shaft, this need not be the case. In some constructions I prefer to run a casing from the supporting bearing or bracket upward to or near the hand-wheel, and under those circumstances I can embody the grooved wheel on this non-rotating sleeve. The whole construction, however, would comprise the steering-pillar, whether with or without a sleeve, so that it may be said that the advantageous construction involves the location of the grooved collar supported on anything as long as the groove encircles the shaft—that is, on the pillar—and located below the operating-wheel and above the vehicle-body-supporting mechanism.

I do not wish to confine myself to the precise features or details of construction hereinbefore described and shown, as my invention may be carried out with various modifications or in some cases reversal of parts, still embodying its advantages and its main features.

What I claim, and desire to secure by Letters Patent, is—

1. A steering mechanism for automobiles comprising a rotating shaft, a bearing for said shaft supporting it solely against axially longitudinal movement, a threaded or gear portion on said shaft, engaging threaded or gear portion coöperating therewith, the latter mounted in a two-armed lever, connections from said lever to the steering-wheels whereby rotation of the shaft causes a deflection of the road-wheels to steer the vehicle.

2. In a steering-gear for automobiles, a rotating steering-shaft, a threaded portion thereon, an engaging threaded portion supported to oscillate on the body or framework of the vehicle, a thrust-resisting universal bearing, an oscillating member depending below the body or frame of the vehicle and connections to steering-wheels relatively movable with respect to the body.

3. In an automobile, controlling connections including a rotating shaft, an oscillated member connected therewith, a jointed thrust-bearing for said shaft and jointed connection with said oscillating member whereby operation between the two will be effective by the rotation of the steering-shaft irrespective of their relative displacement out of a common plane, as and for the purpose described.

4. In an automobile, controlling connections including a rotating shaft, a back-lock transmission mechanism, a flexible thrust-bearing and means for displacing the same on the floor or frame of the vehicle, substantially as and for the purpose described.

5. In an automobile, a pillar or shaft for controlling mechanism, means for supporting the same for to-and-fro movement, a latch for locking the same in a predetermined position and a foot-press for engaging the pillar or shaft to press the same out of normal position, and connections whereby the unlocking of the pillar precedes the forward movement of the pillar.

6. In a steering mechanism for motor-vehicles, a floor or frame plate, two bearings on said plate, a lever supported between said bearings, a shaft projecting beyond one of said bearings and a depending arm supported thereby to oscillate a member of the steering connections, the unsupported end of said lever being two-armed and coacting with a traverse member, means for holding said traverse member, means for actuating said traverse member, substantially as shown and described.

7. In a steering mechanism for vehicles, a rotating steering-shaft, a grooved collar on said shaft in proximity to its upper end, an operating hand-wheel at said upper end, operating connections at the lower end of said shaft whereby a rotation of the shaft effects a movement of connections to the steering-wheels.

8. In a steering mechanism for vehicles, a steering-pillar, an operating hand-wheel at the upper end thereof, a grooved collar supported on the pillar in proximity to the upper end, operating connections at the lower end of the pillar whereby rotation of a member of the pillar effects a movement of the connections to the steering-wheels.

9. In a steering mechanism for vehicles, a rotating shaft, an operating hand wheel or lever at the upper end thereof, a grooved collar supported below the hand-wheel, a hinged support whereby said steering-shaft and collar are moved to and fro.

10. In combination in a hinged steering-pillar for vehicles, an operating hand wheel or lever and means adapted for the attachment of an encircling boot or weather-apron.

11. In an automobile steering equipment, rotating steering-shaft, mechanism at the lower end of said shaft coöperating to oscillate a pivoted member, and connections to the steering-wheel, an operating hand wheel or lever at the upper end of said shaft, normally in proximity to the driver's seat, a support on the vehicle-body for a readily-detachable thrust-bearing on said shaft.

This specification signed and witnessed this 14th day of June, A. D. 1902.

HERBERT W. ALDEN.

In presence of—
CHARLES G. HUNTINGTON,
M. L. CLARK.